(12) United States Patent
Shen et al.

(10) Patent No.: US 11,895,662 B2
(45) Date of Patent: Feb. 6, 2024

(54) METHOD AND DEVICE FOR DETERMINING SIZE OF RESOURCE BLOCK GROUP AND STORAGE MEDIUM

(71) Applicant: GUANGDONG OPPO MOBILE TELECOMMUNICATIONS CORP., LTD., Dongguan (CN)

(72) Inventors: Jia Shen, Dongguan (CN); Yanan Lin, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 567 days.

(21) Appl. No.: 17/129,643

(22) Filed: Dec. 21, 2020

(65) Prior Publication Data

US 2021/0120576 A1    Apr. 22, 2021

Related U.S. Application Data

(63) Continuation of application No. PCT/CN2018/093461, filed on Jun. 28, 2018.

(51) Int. Cl.
*H04W 72/12*    (2023.01)
*H04W 72/23*    (2023.01)

(52) U.S. Cl.
CPC .................................. *H04W 72/23* (2023.01)

(58) Field of Classification Search
CPC ..... H04L 5/001; H04L 5/0053; H04L 5/0023; H04L 5/0092; H04W 72/0453; H04W 72/23; H04W 72/04; H04W 72/12; H04W 72/1263; H04W 48/12

See application file for complete search history.

(56) References Cited

U.S. PATENT DOCUMENTS

| 2013/0242947 | A1 | 9/2013 | Chen et al. | |
| 2019/0149365 | A1* | 5/2019 | Chatterjee | H04L 25/0226 370/329 |
| 2019/0261331 | A1* | 8/2019 | Guthmann | H04L 5/0007 |
| 2021/0058940 | A1* | 2/2021 | Choi | H04L 5/0092 |

(Continued)

FOREIGN PATENT DOCUMENTS

| CN | 102238621 A | 11/2011 |
| CN | 105122861 A | 12/2015 |

(Continued)

OTHER PUBLICATIONS

Ad-hoc chair (Samsung), Chairman's notes of AI 7.1.2 MIMO, 3GPP TSG RAN WG1 Meeting #93, R1-1807785, Busan, Korea, May 21-25, 2018, 32 pgs.

(Continued)

*Primary Examiner* — Awet Haile
(74) *Attorney, Agent, or Firm* — Morgan, Lewis & Bockius LLP

(57) ABSTRACT

Disclosed by this application is a method for determining the size of a resource block group. The method includes: according to a Radio Network Temporary Identifier (RNTI) used for scrambling Downlink Control Information (DCI) and a BandWidth Part (BWP) size, determining, by a terminal device, a resource block group size used for the DCI to schedule a resource.

15 Claims, 4 Drawing Sheets

(56) References Cited

U.S. PATENT DOCUMENTS

2021/0160035 A1* 5/2021 Kittichokechai ..... H04L 5/0053

FOREIGN PATENT DOCUMENTS

WO    WO2017134943 A1    8/2017
WO    WO2020/000322 A1    1/2020

OTHER PUBLICATIONS

Guangdong OPPO Mobile Telecommunications Corp. Ltd., Extended European Search Report, EP18923894.2, dated Jun. 10, 2021, 12 pgs.
Huawei, HiSilicon, Scheduling and resource allocation for bandwidth parts, 3GPP TSG RAN WG1 Meeting #90, R1-1712156, Prague, Czech Republic, Aug. 21-25, 2017, 4 pgs.
OPPO, Text Proposal for DL PRB Bundling, 3GPP TSG RAN WG1 Meeting AH 1801, R1-1800497, Vancouver, Canada, Jan. 22-26, 2018, 3 pgs.
Guangdong OPPO Mobile Telecommunications Corp. Ltd., International Search Report and Written Opinion, PCT/CN2018/093461, dated Mar. 28, 2019, 11 pgs.
Huawei, HiSilicon, "DL/UL resource allocation and TB size determination," 3GPP TSG RAN WG1 Metting #90bis, R1-1717078, Prague, Czech Republic, Oct. 9-13, 2017, 13 pgs.

* cited by examiner

Determine, by the terminal device, an RBG size used for DCI to schedule a resource according to a RNTI used for scrambling the DCI and a BWP size — S101

FIG. 1

METHOD AND DEVICE FOR DETERMINING SIZE OF RESOURCE BLOCK GROUP AND STORAGE MEDIUM

CROSS REFERENCE TO RELATED APPLICATION

This application is a continuation application of PCT Patent Application No. PCT/CN2018/093461, entitled "METHOD AND DEVICE FOR DETERMINING SIZE OF RESOURCE BLOCK GROUP AND STORAGE MEDIUM" filed on Jun. 28, 2018, which is incorporated herein by reference in its entirety.

TECHNICAL FIELD

Embodiments of the present disclosure generally relate to wireless communication technologies, and more particularly, to methods and devices for determining a resource block group size, and a storage medium.

BACKGROUND

In the Long Term Evolution (LTE) system, the frequency domain resource allocation granularity is Resource Block Group (RBG). The number of Resource Blocks (RBs) included in an RBG is related to Bandwidth Part (BWP) of the system. In the 5th Generation (5G) New Radio (NR) system, a bandwidth part corresponds to two RBG sizes, and the two RBG sizes correspond to different scheduling granularities. How to use RBG size to schedule resources to improve the service capabilities of terminal devices and the resource utilization of the NR system, there is currently no solution.

SUMMARY

In order to address the above technical problem, embodiments of the present disclosure provide methods and devices for determining a resource block group size, and a storage medium, which can determine an RBG size according to a Radio Network Temporary Identifier (RNTI) used for scrambling Downlink Control Information (DCI) and a BWP size. Resources can be scheduled based on the determined RBG size, thereby improving the service capabilities of terminal devices and the resource utilization of the NR system.

According to a first aspect, there is provided a method for determining a resource block group size, including:
  according to a Radio Network Temporary Identifier (RNTI) used for scrambling Downlink Control Information (DCI) and a BandWidth Part (BWP) size, determining, by a terminal device, a resource block group size used for the DCI to schedule a resource.

According to a second aspect, there is provided a method for determining a resource block group size, including:
  sending, by a network device, Downlink Control Information (DCI) which is scrambled by a Radio Network Temporary Identifier (RNTI);
  wherein the RNTI and a BandWidth Part (BWP) size are used for a terminal device to determine a resource block group size used for the DCI to schedule a resource.

According to a third aspect, there is provided a terminal device, including
  a determination unit configured to, according to a Radio Network Temporary Identifier (RNTI) used for scrambling Downlink Control Information (DCI) and a BandWidth Part (BWP) size, determine a resource block group size used for the DCI to schedule a resource.

According to a fourth aspect, there is provided a network device, including:
  a sending unit configured to send Downlink Control Information (DCI) which is scrambled by a Radio Network Temporary Identifier (RNTI);
  wherein the RNTI and a BandWidth Part (BWP) size are used for a terminal device to determine a resource block group size used for the DCI to schedule a resource.

According to a fifth aspect, there is provided a terminal device, including:
  a processor; and
  a memory for storing a computer program that executable by the processor;
  wherein when the processer executes the computer program, the processer is caused to perform steps in the method for determining a resource block group size.

According to a sixth aspect, there is provided a network device, including:
  a processor; and
  a memory for storing a computer program that executable by the processor;
  wherein when the processer executes the computer program, the processer is caused to perform steps in the method for determining a resource block group size.

According to a seventh aspect, there is provided a storage medium storing an executable program, wherein when the executable program is executed by a processor, the processer is caused to perform the method for determining a resource block group size.

According to an eighth aspect, there is provided a storage medium storing an executable program, wherein when the executable program is executed by a processor, the processer is caused to perform the method for determining a resource block group size.

In embodiments of the present disclosure, the terminal device determines the RBG size according to the RNTI used for scrambling the DCI and the BWP size. Because the network device dynamically sends the DCI to the terminal device, the terminal device can dynamically determine the RBG size. Thus, depending on different service types, the terminal device can schedule resources by dynamically choosing an RBG size matching the service types, thereby improving the service capabilities of terminal device and the resource utilization of the NR system.

BRIEF DESCRIPTION OF THE DRAWINGS

FIG. 1 is a schematic diagram showing an optional processing flow for determining a resource block group size by a terminal device according to an embodiment of the present disclosure.

DETAILED DESCRIPTION

Figure 2:
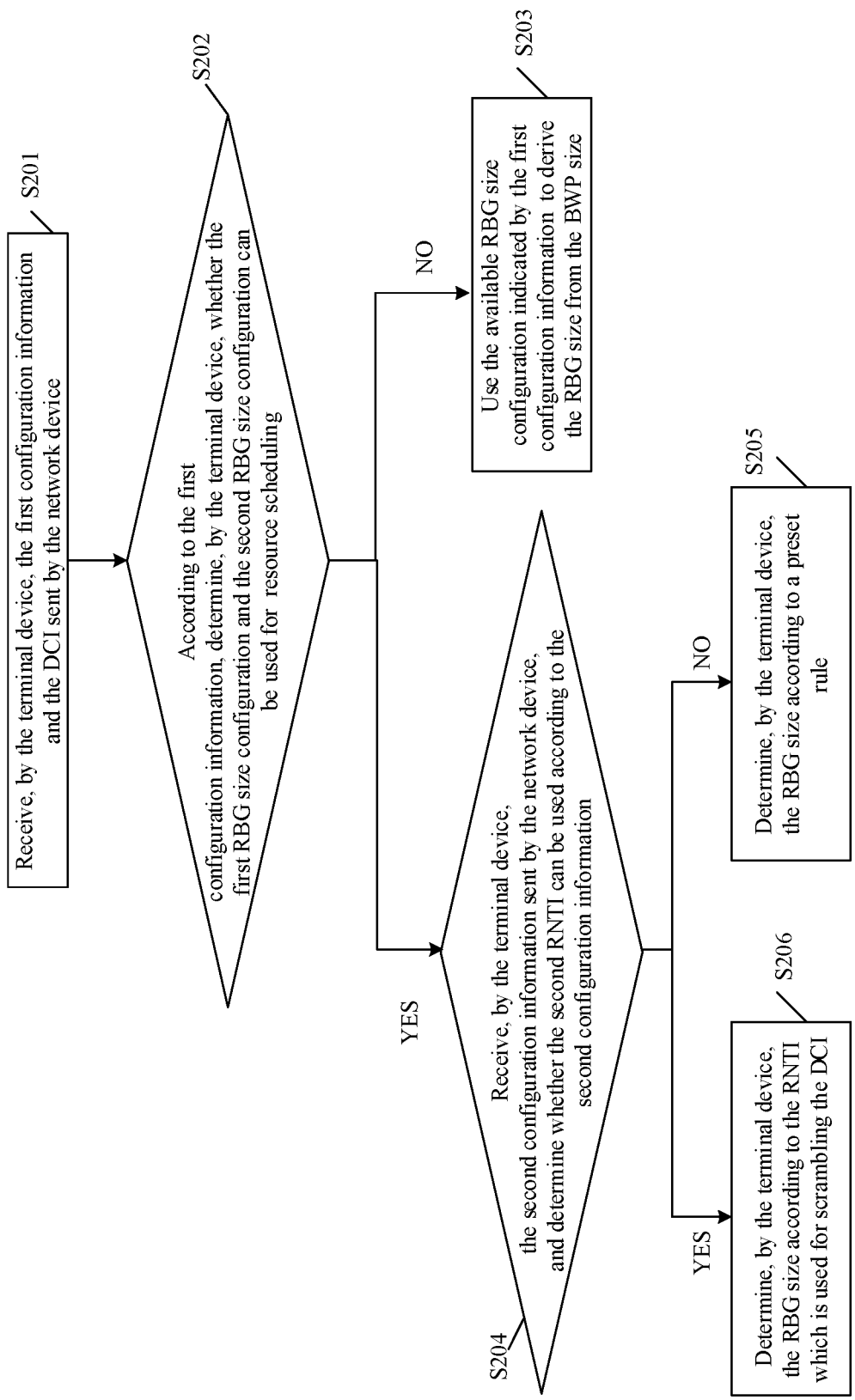
FIG. 2 is a schematic diagram showing a processing flow of a method for determining a resource block group size according to an embodiment of the present disclosure.

In order to understand the features and technical contents of embodiments of the present disclosure in more detail, the implementation of the embodiments of the present disclosure will be described in detail below with reference to the accompanying drawings. The attached drawings are for the illustrative purpose and are not intended to limit the scope of the present disclosure.

In order to better understand the technical solutions of embodiments of the present disclosure, the RBG size configuration in the 5G NR system will be briefly described below.

In the 5G NR standards, the mapping relationship between two sets of RBG size configurations and the BWP of the terminal device is adopted. As shown in Table 1, one BWP corresponds to Configuration 1 and Configuration 2, and Configuration 1 and Configuration 2 are two sets of RBG size configurations. The network device can semi-statically configure that the terminal device uses Configuration 1 or Configuration 2 to determine the RBG size.

TABLE 1

| BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The applicant found that the scheduling granularity of Configuration 1 is relatively small, and more flexible resource allocation can be adopted for Enhanced Mobile Broadband (eMBB) services; Configuration 2 has relatively large scheduling granularity and can be used for Ultra Reliable & Low Latency Communication (URLLC) to allocate wider frequency domain resources. However, related art only supports semi-static switching between Configuration 1 and Configuration 2, and the switching cycle is long, the terminal device cannot effectively support both eMBB and URLLC services at the same time, and also the system resource utilization is low.

FIG. 1 is a schematic diagram showing an optional processing flow for determining a resource block group size by a terminal device according to an embodiment of the present disclosure. The method includes the following steps:

In step S101, the terminal device determines an RBG size used for DCI to schedule a resource according to a RNTI used for scrambling the DCI and a BWP size.

In some implementations, before determining the RBG size used for the DCI to schedule the resource, the terminal device first receives DCI and first configuration information. The first configuration information includes selection information regarding an RBG size configuration, and the RBG size configuration includes at least a first resource block group size configuration and a second resource block group size configuration.

When a value of the first configuration information is a first value, that is, when the first configuration information indicates that both the first RBG size configuration and the second RBG size configuration can be used for the DCI to perform resource scheduling, the terminal device obtains the RNTI that is used to scramble the DCI. When the terminal device determines that the RNTI is a first RNTI, the terminal device, according to a preset mapping relationship between RNTIs and RBG size configurations, searches for the RBG size configuration corresponding to the first RNTI, and the searched RBG size configuration is the first RBG Size configuration; and then, based on Table 1, the terminal device finds the value corresponding to the BWP size carrying DCI in the Configuration 1 (first RBG size configuration) column to obtain the RBG size.

In other embodiments, the terminal device receives the DCI and third configuration information. The third configuration information includes a mapping relationship between RNTIs and resource block group size configurations. The third configuration information includes first indication information and/or second indication information. The terminal device obtains the RNTI that is used to scramble the DCI. When the terminal device determines that the RNTI is a first RNTI, the terminal device obtains the first indication information corresponding to the first RNTI according to the mapping relationship, and determines the RBG size used for the DCI to schedule the resource according to the RBG size configuration and BWP size as indicated by the first indication information. For example, the RNTI that is used to scramble the DCI is the first RNTI, and the first indication information corresponding to the first RNTI indicates the second RBG size configuration, and the terminal device finds the value corresponding to the BWP size carrying DCI in the Configuration 2 (second RBG size configuration) column to obtain the RBG size.

It should be noted that, in embodiments of the present disclosure, when the DCI is used for scheduling a downlink resource, the BWP is a downlink BWP; and when the DCI is used for scheduling an uplink resource, the BWP is an uplink BWP.

Another optional processing procedure for determining a resource block group size provided by an embodiment of the present disclosure is similar to the processing procedure shown in FIG. 1, except that when the first configuration information indicates that both the RBG size configuration and the second RBG size configuration can be used, the terminal device receives second configuration information sent by the network device. When a value of the second configuration information is a second value, it indicates that the second RNTI can be used. The terminal device determines the RBG size according to the RNTI that is used to scramble the DCI and the BWP Size. Therefore, based on the optional embodiment shown in FIG. 1, this embodiment also includes control over whether the second RNTI is available.

FIG. 2 shows a processing flow of an exemplary embodiment for determining the resource block group size. The method includes the following steps:

In step S201, the terminal device receives the first configuration information and the DCI sent by the network device.

In step S202, the terminal device determines whether the first RBG size configuration and the second RBG size configuration can be used for resource scheduling according to the first configuration information. When the determination result is negative, step S203 is performed; when the determination result is positive, step S204 is performed.

Here, if the determination result is negative, it means that one of the first RBG size configuration and the second RBG size configuration can be used for resource scheduling.

In step S203, the available RBG size configuration indicated by the first configuration information is used to derive the RBG size from the BWP size.

In step S204, the terminal device receives the second configuration information sent by the network device, and determines whether the second RNTI can be used according to the second configuration information; if the determination result is negative, step S205 is performed; and if the determination result is positive, step S206 is performed.

Here, the second RNTI is different from the first RNTI, and the first RNTI is a C-RNTI (Cell-Radio Network Temporary Identifier).

In step S205, the terminal device determines the RBG size according to a preset rule.

Here, the terminal device uses the second RBG size configuration to derive the RBG size from the BWP Size according to the preset rule. The preset rule may be agreed by the protocol.

In step S206, the terminal device determines the RBG size according to the RNTI which is used for scrambling the DCI.

In some embodiments, if the RNTI used for scrambling the DCI is the first RNTI, the first RBG size configuration corresponding to the first RNTI is adopted to derive the RBG size from the BWP size; if the RNTI used for scrambling the DCI is the second RNTI, the second RBG size configuration corresponding to the second RNTI is adopted to drive the RBG size from the BWP size.

Figure 3:
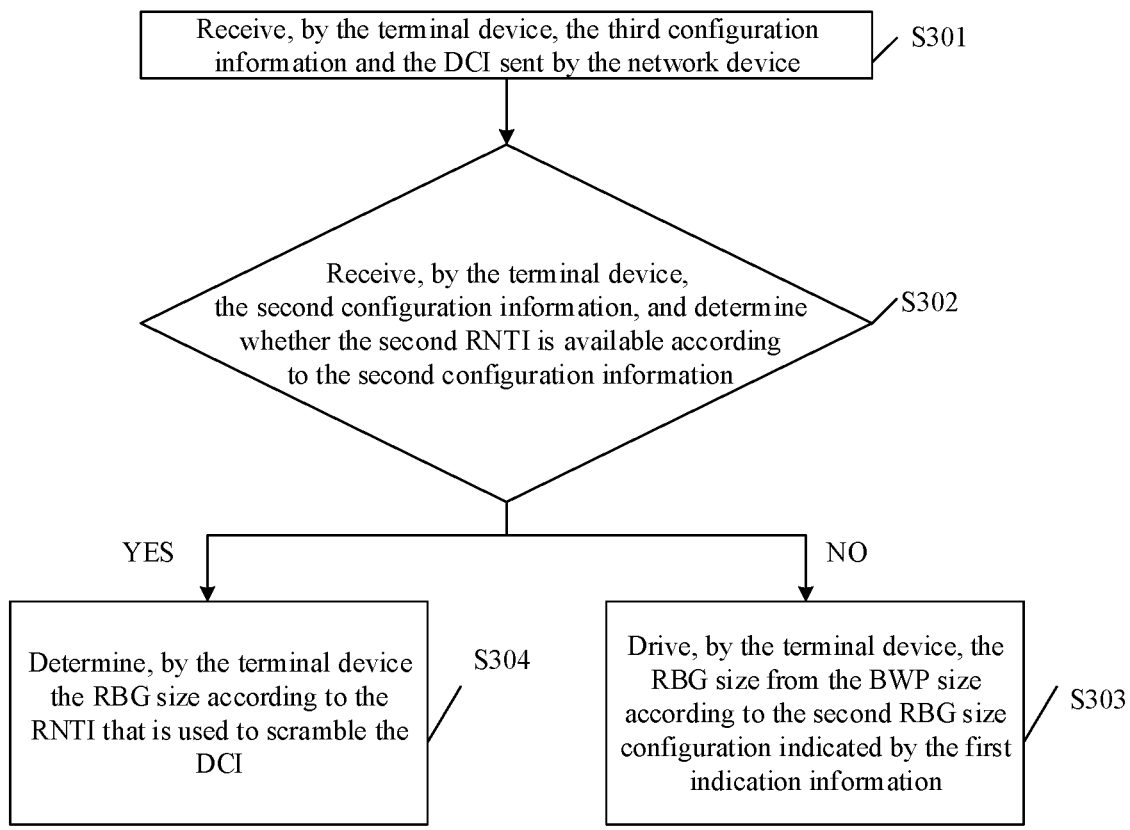
FIG. 3 is a schematic diagram showing a processing flow of a method for determining a resource block group size according to an embodiment of the present disclosure.

FIG. 3 shows a processing flow of another exemplary embodiment of the present disclosure. The method includes the following steps:

In step S301, the terminal device receives the third configuration information and the DCI sent by the network device.

In embodiments of the present disclosure, the third configuration information includes a mapping relationship between RNTIs and RBG size configurations, and the third configuration information includes first indication information and second indication information. The first indication information and the second indication information are used to indicate the RBG size configurations corresponding to the first RNTI and the second RNTI, respectively. For example, when the first indication information is used to indicate that the RNTI that is used to scramble the DCI is the first RNTI, the second RBG size configuration is used; when the second indication information is used to indicate that the RNTI that is used to scramble the DCI is the second RNTI, the first RBG size configuration is used.

In step S302, the terminal device receives the second configuration information, and determines whether the second RNTI is available according to the second configuration information; when the determination result is negative, step S303 is performed; and when the determination result is positive, step S304 is performed.

Here, if the determination result is negative, it means that the second RNTI cannot be used to determine the RBG size for DCI resource scheduling.

In step S303, the terminal device derives the RBG size from the BWP size according to the second RBG size configuration indicated by the first indication information.

In step S304, the terminal device determines the RBG size according to the RNTI that is used to scramble the DCI.

In embodiments of the present disclosure, when the terminal device determines that the RNTI that is used to scramble the DCI is the first RNTI, the terminal device derives the RBG size from the BWP size according to the second RBG size configuration indicated by the first indication information; when the terminal device determines that the RNTI that is used to scramble the DCI is the second RNTI, the terminal device derives the RBG size from the BWP size according to the first RBG size configuration indicated by the second indication information.

Figure 4:
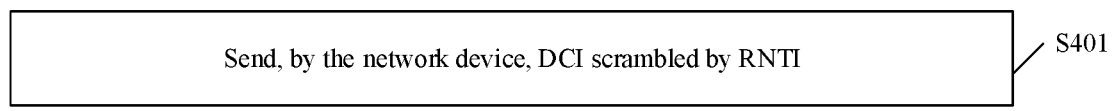
FIG. 4 is a schematic diagram showing an optional processing flow for determining a resource block group size by a network device according to an embodiment of the present disclosure.

FIG. 4 shows an optional processing procedure for determining a resource block group size by a network device according to an embodiment of the present disclosure. The method includes the following steps:

In step S401, the network device sends DCI scrambled by RNTI.

Here, the RNTI and BWP are used by the terminal device to determine the RBG size used by the DCI for resource scheduling.

In embodiments of the present disclosure, before the network device sends the DCI scrambled by RNTI to the terminal device, the network device sends the first configuration information and the second configuration information to the terminal device. The first configuration information includes the selection information regarding the RBG size configuration. When a value of the first configuration information is the first value, the first configuration information indicates that both the first RBG size configuration and the second RBG size configuration can be used for DCI to schedule resources.

When the value of the second configuration information is the second value, it indicates that the second RNTI can be used; when the value of the second configuration information is the third value, it indicates that the second RNTI is not used; the second RNTI is different from the first RNTI, and the first RNTI is C-RNTI.

It should be noted that, in embodiments of the present disclosure, when the DCI is used for scheduling a downlink resource, the BWP is a downlink BWP; and when the DCI is used for scheduling an uplink resource, the BWP is an uplink BWP.

Figure 5:
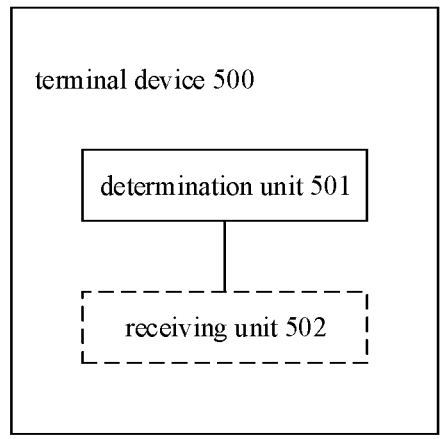
FIG. 5 is a schematic diagram of a terminal device according to an embodiment of the present disclosure.

Based on the above methods for determining a resource block group, an embodiment of the present disclosure provides a terminal device. FIG. 5 shows the structure of the terminal device 500. The terminal device 500 includes a determination unit 501 configured to, according to a RNTI used for scrambling DCI and a BWP size, determine a resource block group size used for the DCI to schedule a resource.

According to an embodiment of the present disclosure, the terminal device 500 further includes a receiving unit 502 configured to receive the first configuration information and the DCI.

The first configuration information includes selection information regarding an RBG size configuration, and the resource block group size configuration includes at least a first RBG size configuration and a second RBG size configuration.

According to an embodiment of the present disclosure, when a value of the first configuration information is a first value, the first configuration information indicates that both the first resource block group size configuration and the second resource block group size configuration are used for the DCI to schedule the resource.

According to an embodiment of the present disclosure, the receiving unit 502 is further configured to receive second configuration information;

when a value of the second configuration information is a second value, the second configuration information indicates using the second RNTI;

when the value of the second configuration information is a third value, the second configuration information indicates not using the second RNTI;

the second RNTI is different from the first RNTI, and the first RNTI is a C-RNTI.

According to an embodiment of the present disclosure, the determination unit 502 is configured to determine an RBG size based on a preset mapping relationship between RNTIs and resource block group size configurations and the RNTI.

According to an embodiment of the present disclosure, the determination unit 501 is configured to:

determine the RBG size used for the DCI to schedule the resource based on the first RBG size configuration corresponding to a first RNTI used for scrambling the DCI in the mapping relationship and the BWP size; and determine the RBG size used for the DCI to schedule the resource based on the second RBG size configuration corresponding to a second RNTI used for scrambling the DCI in the mapping relationship and the BWP size.

According to an embodiment of the present disclosure, the receiving unit 502 is configured to receive third configuration information. The third configuration information includes a mapping relationship between RNTIs and RBG size configurations. The third configuration information includes first indication information and/or second indication information.

According to an embodiment of the present disclosure, the determination unit 501 is configured to:

determine the RBG size used for the DCI to schedule the resource based on a first resource block group size configuration indicated by the first indication information corresponding to a first RNTI used for scrambling the DCI in the mapping relationship and the BWP size; and determine the RBG size used for the DCI to schedule the resource based on a second resource block group size configuration indicated by the second indication information corresponding to a second RNTI used for scrambling the DCI in the mapping relationship and the BWP size.

According to an embodiment of the present disclosure, when the DCI is used to schedule a downlink resource, and the BWP is a downlink BWP;

or the DCI is used to schedule an uplink resource, and the BWP is an uplink BWP.

Figure 6:
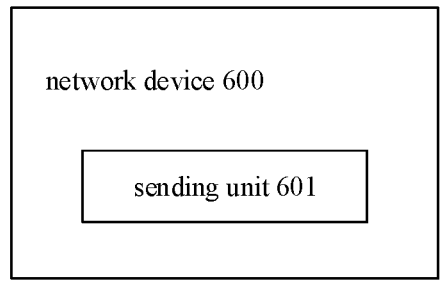
FIG. 6 is a schematic diagram of a network device according to an embodiment of the present disclosure.

Based on the above methods for determining a resource block group size, an embodiment of the present disclosure provides a network device. FIG. 6 shows the structure of the network device 600. The network device 600 includes a sending unit 601 configured to send DCI which is scrambled by a RNTI; the RNTI and a BWP size are used for a terminal device to determine a resource block group size used for the DCI to schedule a resource.

According to an embodiment of the present disclosure, the sending unit 601 is configured to send first configuration information, and the first configuration information includes selection information regarding an RBG size configuration.

According to an embodiment of the present disclosure, when a value of the first configuration information is a first value, the first configuration information indicates that both a first resource block group size configuration and a second resource block group size configuration are used for the DCI to schedule the resource.

According to an embodiment of the present disclosure, the sending unit 601 is configured to send second configuration information;

when a value of the second configuration information is a second value, the second configuration information indicates using the second RNTI;

when the value of the second configuration information is a third value, the second configuration information indicates not using the second RNTI;

the second RNTI is different from the first RNTI, and the first RNTI is a C-RNTI.

According to an embodiment of the present disclosure, the DCI is used to schedule a downlink resource, and the BWP is a downlink BWP;

or the DCI is used to schedule an uplink resource, and the BWP is an uplink BWP.

Embodiments of the present disclosure have the following technical advantages:

In embodiments of the present disclosure, DCI is scrambled by an RNTI, and each kind of RNTI corresponds to an RBG size configuration, so that the terminal device can schedule frequency domain resources corresponding to different RBG size configurations based on different RNTI. Thus, depending on different service types (such as eMBB and URLLC), the terminal device can perform resource scheduling and allocation by dynamically choosing a frequency domain granularity, thereby improving the service capabilities of terminal device and the resource utilization of the NR system.

Figure 7:
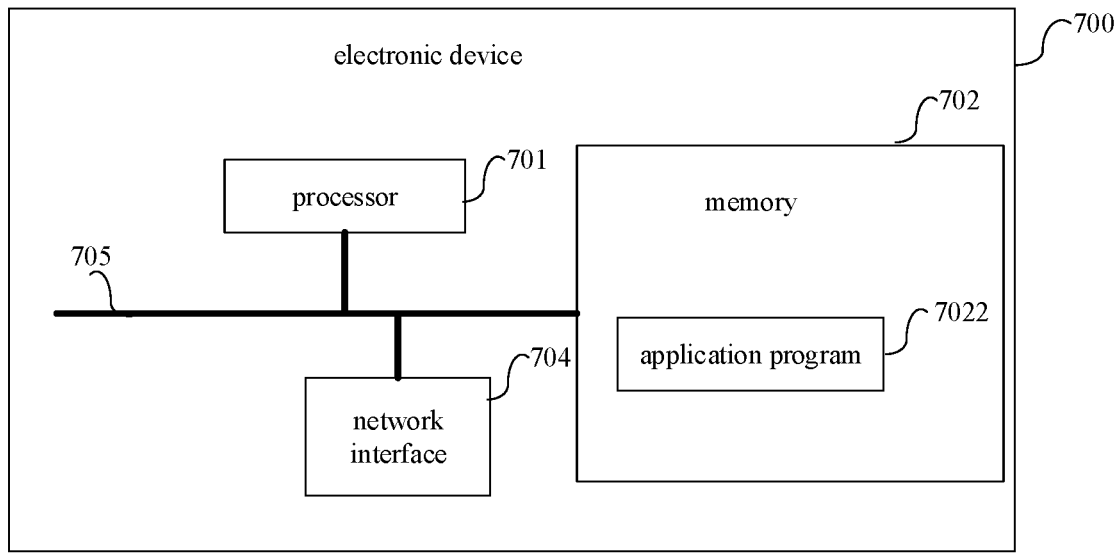
FIG. 7 is a schematic diagram showing hardware composition of an electronic device according to an embodiment of the present disclosure.

FIG. 7 is a schematic diagram showing hardware composition of an electronic device (a network device or a terminal device) according to an embodiment of the present disclosure. The electronic device 700 includes at least one processor 701, a memory 702 and at least one network interface 704. The components in the electronic device 700 are coupled together through a bus system 705. It can be understood that the bus system 705 is used to implement connection and communication between these components. In addition to the data bus, the bus system 705 also includes a power bus, a control bus, and a status signal bus. For clarity of description, various buses are marked as the bus system 705 in FIG. 7.

It can be understood that the memory 702 may be a volatile memory or a non-volatile memory, and may also include both volatile and non-volatile memory. The non-volatile memory can be ROM, Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic surface storage, optical disk, or Compact Disc Read-Only Memory (CD-ROM). The magnetic surface storage can be disk storage or tape storage. The volatile memory may be Random Access Memory (RAM), which is used as an external cache. By way of exemplary but not restrictive description, many forms of RAM can be used, such as Static Random Access Memory (SRAM), Synchronous Static Random Access Memory (SSRAM), Dynamic Random Access Memory (DRAM,), Synchronous Dynamic Random Access Memory (SDRAM), Double Data Rate Synchronous Dynamic Random Access Memory (DDRSDRAM), Enhanced ESDRAM (Enhanced Synchronous Dynamic Random Access Memory), Synchronous Link Dynamic Random Access Memory (SLDRAM), or Direct Rambus Random Access Memory (DRRAM). The memory 702 described in embodiments of the present disclosure is intended to include, but is not limited to, these and any other suitable types of memory.

The memory 702 in embodiments of the present disclosure is used to store various types of data to support operation of the electronic device 700. Examples of these data include: any computer program running on the electronic device 700, such as application program 7022. The program for implementing the methods of embodiments of the present disclosure may be included in the application program 7022.

The methods disclosed in the foregoing embodiments of the present disclosure may be applied to the processor 701 or implemented by the processor 701. The processor 701 may be an integrated circuit chip with signal processing capability. In implementations, the steps of the foregoing methods can be completed by a hardware integrated logic circuit or instructions in software form in the processor 701 The aforementioned processor 701 may be a general-purpose processor, a Digital Signal Processor (DSP), or other programmable logic device, discrete gate or transistor logic device, discrete hardware component, and the like. The processor 701 may implement or execute various methods, steps, and logical block diagrams disclosed in embodiments of the present disclosure. The general-purpose processor may be a microprocessor or any conventional processor. The steps of the methods disclosed in embodiments of the present disclosure can be directly embodied as being performed by a hardware decoding processor, or being performed by a combination of hardware and software modules in the decoding processor. The software modules may be located in a storage medium, and the storage medium is located in the memory 702. The processor 701 reads the information in the memory 702 and completes the steps of the foregoing methods in combination with its hardware.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic components to perform the aforementioned methods.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing device to generate a machine, so that the instructions executed by the processor of the computer or other programmable data processing device to generate a device that implements the functions specified in one process or multiple processes in the flowcharts and/or one block or multiple blocks in the block diagrams.

These computer program instructions can also be stored in a computer-readable memory that can direct a computer or other programmable data processing device to work in a specific manner, so that the instructions stored in the computer-readable memory produce an article of manufacture including the instruction device. The instruction device implements the functions specified in one process or multiple processes in the flowcharts and/or one block or multiple blocks in the block diagrams.

These computer program instructions can also be loaded on a computer or other programmable data processing device, so that a series of operation steps are executed on the computer or other programmable device to produce computer-implemented processes. In this way, instructions executed by the computer or other programmable device provide steps for implementing the functions specified in one process or multiple processes in the flowcharts and/or one block or multiple blocks in the block diagrams.

The above are only exemplary embodiments of the present disclosure and are not used to limit the protection scope of the present disclosure. Any modification, equivalent replacement and improvement made within the spirit and principle of the present disclosure fall within the protection scope of the present disclosure.

What is claimed is:

1. A method for determining a resource block group size, comprising:
   receiving, by a terminal device, first configuration information, wherein the first configuration information comprises selection information regarding a resource block group size configuration, and the resource block group size configuration comprises at least a first resource block group size configuration and a second resource block group size configuration;
   receiving, by the terminal device, Downlink Control Information (DCI);
   when a value of the first configuration information is a first value, the first configuration information indicates that both the first resource block group size configuration and the second resource block group size configuration are used for the DCI to schedule the resource;
   when both the first resource block group size configuration and the second resource block group size configuration are used for the DCI to schedule the resource, receiving, by the terminal device, second configuration information sent from a network device, and determining whether a second Radio Network Temporary Identifier (RNTI) can be used according to the second configuration information, the second RNTI is different from a first RNTI, and the first RNTI is a Cell-Radio Network Temporary Identifier (C-RNTI);
   when the second RNTI can be used, according to a Radio Network Temporary Identifier (RNTI) used for scrambling the DCI and a BandWidth Part (BWP) size, determining, by a terminal device, a resource block group size used for the DCI to schedule a resource; and
   when the second RNTI cannot be used, determining by the terminal device, the resource block group size used for the DCI according to a preset rule.

2. The method according to claim 1, wherein according to the RNTI used for scrambling the DCI and the BWP size, determining, by the terminal device, the resource block group size used for the DCI to schedule the resource, comprises:
   determining, by the terminal device, a resource block group size configuration based on a preset mapping relationship between RNTIs and resource block group size configurations and the RNTI.

3. The method according to claim 2, wherein according to the RNTI used for scrambling the DCI and the BWP size, determining, by the terminal device, the resource block group size used for the DCI to schedule the resource, comprises:
   determining, by the terminal device, the resource block group size used for the DCI to schedule the resource based on the first resource block group size configuration corresponding to the first RNTI used for scrambling the DCI in the mapping relationship and the BWP size; and determining, by the terminal device, the resource block group size used for the DCI to schedule the resource based on the second resource block group size configuration corresponding to the second RNTI used for scrambling the DCI in the mapping relationship and the BWP size.

4. The method according to claim 1, wherein according to the RNTI used for scrambling the DCI and the BWP size, determining, by the terminal device, the resource block group size used for the DCI to schedule the resource, comprises:
receiving, by the terminal device, third configuration information, wherein the third configuration information comprises a mapping relationship between RNTIs and resource block group size configurations.

5. The method according to claim 4, wherein the third configuration information comprises first indication information and/or second indication information;
wherein according to the RNTI used for scrambling the DCI and the BWP size, determining, by the terminal device, the resource block group size used for the DCI to schedule the resource, comprises:
determining, by the terminal device, the resource block group size used for the DCI to schedule the resource based on a first resource block group size configuration indicated by the first indication information corresponding to the first RNTI used for scrambling the DCI in the mapping relationship and the BWP size; and
determining, by the terminal device, the resource block group size used for the DCI to schedule the resource based on a second resource block group size configuration indicated by the second indication information corresponding to the second RNTI used for scrambling the DCI in the mapping relationship and the BWP size.

6. The method according to claim 1,
wherein when a value of the second configuration information is a second value, the second configuration information indicates that the second RNTI can be used; and
wherein when the value of the second configuration information is a third value, the second configuration information indicates that the second RNTI cannot be used.

7. The method according to claim 1, wherein the DCI is used to schedule a downlink resource, and the BWP is a downlink BWP;
or the DCI is used to schedule an uplink resource, and the BWP is an uplink BWP.

8. A method for determining a resource block group size, comprising:
sending, by a network device, first configuration information, wherein the first configuration information comprises selection information regarding a resource block group size configuration, and the resource block group size configuration comprises at least a first resource block group size configuration and a second resource block group size configuration;
when a value of the first configuration information is a first value, the first configuration information indicates that both the first resource block group size configuration and the second resource block group size configuration are used for Downlink Control Information (DCI) to schedule a resource;
sending, by the network device, the DCI which is scrambled by a Radio Network Temporary Identifier (RNTI);

when both the first resource block group size configuration and the second resource block group size configuration are used for the DCI to schedule the resource, sending, by the network device, second configuration information sent to a terminal device;
wherein the RNTI and a BandWidth Part (BWP) size are used for a terminal device to determine a resource block group size used for the DCI to schedule the resource, and the second configuration information is used for the terminal device to determine whether a second RNTI can be used, the second RNTI is different from a first RNTI, and the first RNTI is a Cell-Radio Network Temporary Identifier (C-RNTI);
when the second RNTI can be used, the terminal device determines a resource block group size used for the DCI to schedule a resource according to the RNTI used for scrambling the DCI and the BWP size; and
when second RNTI cannot be used, determining by the terminal device, the resource block group size used for the DCI according to a preset rule.

9. A terminal device, comprising a processor, a transceiver, and a memory for storing instructions that, when executed by the processor, cause the processor to:
control the transceiver to receive first configuration information, wherein the first configuration information comprises selection information regarding a resource block group size configuration, and the resource block group size configuration comprises at least a first resource block group size configuration and a second resource block group size configuration;
control the transceiver to receive Downlink Control Information (DCI);
when a value of the first configuration information is a first value, the first configuration information indicates that both the first resource block group size configuration and the second resource block group size configuration are used for the DCI to schedule the resource;
when both the first resource block group size configuration and the second resource block group size configuration are used for the DCI to schedule the resource, control the transceiver to receive second configuration information sent from a network device, and determine whether a second Radio Network Temporary Identifier (RNTI) can be used according to the second configuration information, the second RNTI is different from a first RNTI, and the first RNTI is a Cell-Radio Network Temporary Identifier (C-RNTI);
when the second RNTI can be used, according to a Radio Network Temporary Identifier (RNTI) used for scrambling the DCI and a BandWidth Part (BWP) size, determine a resource block group size used for the DCI to schedule a resource; and
when the second RNTI cannot be used, determine the resource block group size used for the DCI according to a preset rule.

10. The terminal device according to claim 9, wherein the processor is configured to:
determine a resource block group size configuration based on a preset mapping relationship between RNTIs and resource block group size configurations and the RNTI.

11. The terminal device according to claim 10, wherein the processor is configured to:
determine the resource block group size used for the DCI to schedule the resource based on the first resource block group size configuration corresponding to the first RNTI used for scrambling the DCI in the mapping relationship and the BWP size; and determine the resource block group size used for the DCI to schedule the resource based on the second resource block group size configuration corresponding to the second RNTI used for scrambling the DCI in the mapping relationship and the BWP size.

12. The terminal device according to claim 9, wherein the processor is configured to control the transceiver to:

receive third configuration information, wherein the third configuration information comprises a mapping relationship between RNTIs and resource block group size configurations.

13. The terminal device according to claim 12, wherein the third configuration information comprises first indication information and/or second indication information;

wherein the processor is configured to:

determine the resource block group size used for the DCI to schedule the resource based on a first resource block group size configuration indicated by the first indication information corresponding to the first RNTI used for scrambling the DCI in the mapping relationship and the BWP size; and determine the resource block group size used for the DCI to schedule the resource based on a second resource block group size configuration indicated by the second indication information corresponding to the second RNTI used for scrambling the DCI in the mapping relationship and the BWP size.

14. The terminal device according to claim 9, wherein:

when a value of the second configuration information is a second value, the second configuration information indicates that the second RNTI can be used;

when the value of the second configuration information is a third value, the second configuration information indicates that the second RNTI cannot be used.

15. The terminal device according to claim 9, wherein the DCI is used to schedule a downlink resource, and the BWP is a downlink BWP;

or the DCI is used to schedule an uplink resource, and the BWP is an uplink BWP.

* * * * *